United States Patent [19]
Tanimura

[11] Patent Number: 5,257,475
[45] Date of Patent: Nov. 2, 1993

[54] POT AGGREGATE FOR RAISING SEEDLINGS AND PROCESS FOR MANUFACTURING THE SAME

[75] Inventor: Masashi Tanimura, Obihiro, Japan

[73] Assignee: Nihon Tensaiseito Kabushiki Kaisha, Tokyo, Japan

[21] Appl. No.: 701,082

[22] Filed: May 16, 1991

[30] Foreign Application Priority Data

May 30, 1990 [JP] Japan .................... 2-138333

[51] Int. Cl.$^5$ ............................ A01G 23/02
[52] U.S. Cl. ............................ 47/74; 47/87; 47/86
[58] Field of Search ............ 229/117; 47/86, 74, 47/87

[56] References Cited

U.S. PATENT DOCUMENTS

| | | | |
|---|---|---|---|
| 2,702,154 | 2/1955 | Linson | 229/117 |
| 3,164,507 | 1/1965 | Masuda et al. | |
| 3,443,739 | 5/1969 | Adams | 229/117 |
| 3,494,536 | 2/1970 | Henry | 229/117 |
| 3,739,522 | 6/1973 | Greenbaum | |
| 4,021,966 | 5/1977 | Rimpinen et al. | |
| 4,132,337 | 1/1979 | Masuda et al. | |
| 4,266,716 | 5/1981 | Austin | 229/117 |
| 4,439,950 | 4/1984 | Kelley | |
| 4,763,443 | 8/1988 | Williams | |

FOREIGN PATENT DOCUMENTS

| | | |
|---|---|---|
| 949319 | 9/1956 | Fed. Rep. of Germany . |
| 48-1126 | 1/1973 | Japan . |
| 992856 | 5/1965 | United Kingdom . |
| 1559343 | 1/1980 | United Kingdom . |

*Primary Examiner*—Henry E. Reduazo
*Attorney, Agent, or Firm*—Oliff & Berridge

[57] ABSTRACT

Herein disclosed is a band for forming a seedling raising bottomed pot aggregate, in which multiple rows of a plurality of pots are aggregated. The bottoms of the pots are formed by making specific planar structures in a material paper having a constant width and by adhering, combining and cutting the paper. The pot aggregate can be easily manufactured by expanding the band. The bottoms are extended from the lower sides of the side walls of the cubes and are folded inward at a right angle from the adjoining extensions. These adjoining extensions are adhered on one of the diagonals of the bottoms, and the extensions on the other diagonal are overlapped.

19 Claims, 4 Drawing Sheets

POT AGGREGATE FOR RAISING SEEDLINGS AND PROCESS FOR MANUFACTURING THE SAME

BACKGROUND OF THE INVENTION

1. Field of the Invention

The present invention relates to a pot aggregate for raising and transplanting seedlings, in which a number of pots to be formed with bottoms when expanded are aggregated, and a process for manufacturing the same.

2. Description of the Prior Art

Heretofore, there are known a variety of pot structures which are made of paper or paper-like thin film (as will be shortly called the "paper") so that they may be used as pots for raising and transplanting seedlings. Most of the pot aggregates have cylindrical structures having neither cover nor bottom. In U.S. Pat. No. 3,164,507 or B.P. No. 992,856, for example, there is disclosed a pot aggregate, in which a number of uncovered and unbottomed pots are aggregated by having their mutual side walls adhered by a water-soluble adhesive. In U.S. Pat. No. 4,132,337 or B.P. No. 1,559,343, on the other hand, there is disclosed a continuous pot aggregate, in which a series of individual pots can be extracted through perforations facilitating their tears.

The raising of seedlings and transplatations using the cylindrical pots of the prior art are accomplished by packing the expanded individual pots of the aggregate with soil, by sowing the seeds, by sprinkling water to raise the seedlings under raising conditions for a constant period, and by transplanting the seedlings separately one by one in the field by using a selected transplanter suitable for the seedlings.

If, in this case, the used pots have a relatively small sectional diameter, the soil packed in the pots is so sufficiently held that it will not drop. If the pot diameter exceeds 50 mm, the soil holding force of the pots becomes incomplete to allow the soil to drop.

The present invention relates to both a pot aggregate suited for preventing the soil from dropping out of the pots and a process for manufacturing the same.

The bottom pots made of the thin film are well known in the prior art. In Japanese Patent Publication No. 1126 of 1973 (as will be shortly referred to as Jap. 1126/73), for example, there is disclosed a seedling raising paper box aggregate, in which a number of unit boxes are formed by gluing and folding a long paper and are juxtaposed to one another with their outer walls overlapped and adhered by a water-soluble adhesive. In U.S. Pat. No. 4,021,966, on the other hand, there is disclosed the PLANTCUP ELEMENT, in which multiple unit cups each having a square section, four flat and parallel side walls and a bottom extended from the lower portions of only one pair of side walls (but not connected to the lower portions of the other pair of side walls) are arrayed in multiple parallel rows and in which the adjoining unit cups have their upper corners connected to each other. In U.S. Pat. No. 3,739,522, there are disclosed the HORTICULTURAL CELL SYSTEM, in which a sheet material such as a thermoplastic film is folded into two layers, in which these two layers are glued at a constant longitudinal interval to form a band and in which the adjoining bands are opened in an egg-shaped section to form cells, and a process for manufacturing the SYSTEM.

The seedling raising paper box aggregate disclosed in Jap. 1126/73 requires troublesome procedures for forming each of the unit boxes of the aggregate by gluing and folding one long sheet and for aggregating the unit boxes by overlapping and gluing the predetermined transverse widths of the flat folded boxes. If the unit boxes are thus individually formed, a major factor for dropping the production yield is raised for the mass production so that the aggregation is difficult to practice.

From the circumstances thus far described, it has been desired to complete the seedling raising bottomed pot aggregate which can be easily mass-produced.

SUMMARY OF THE INVENTION

According to a feature of the present invention, there is provided a seedling raising pot aggregate which is composed of a plurality of bottomed regular cubes such that the bottom is formed of the extensions extending from the lower sides of the side walls of the cubes by folding the separated adjoining extensions inward at a right angle and by adhering the adjoining extensions on one of the pairs of diagonals of the cube bottom while overlapping the extensions on the other pair of diagonals.

A process for manufacturing the aforementioned pot aggregate of the present invention, comprises the steps of: cutting the central portion of a portion of $\frac{1}{2}N$ of a paper having a width of $(H+\frac{1}{2}N)$ and a length of $(2N)$ in parallel with the two end edges of the paper, if the regular cubes have a height H and a side of a length N; applying a water resistant adhesive (e.g., acrylic emulsion) to the margins at the two end edges of said paper and the margins of 45 degrees connecting the two ends of said $\frac{1}{2}N$ portion to said end edges, overlapping and adhering another paper having identical sizes to the first-named paper, and cutting between said ends and said end edges, to form a unit paper; overlapping a plurality of said unit papers along said cut and said extension and adhering the overlapped portions other than said $\frac{1}{2}N$ portion by a water-soluble adhesive, and sequentially repeating the adhering step to form a band having a series of partial overlaps; and overlapping another band back to back on said band, adhering the side walls of said cubes excepting the opposed $\frac{1}{2}N$ portions, repeating the overlapping and adhering steps to form a plurality of overlapped bands, peeling the unit papers at the two ends of said overlapped bands along the extension of said cut to form each of said unit papers into a regular cube having one side of N, and accordingly folding said $\frac{1}{2}N$ portions having said edges at a right angle with respect to the walls of said cubes to form a bottom in each cube. Incidentally, the aforementioned $\frac{1}{2}N$ size indicates the maximum but may be smaller size in accordance with the gist of the present invention.

The present invention has an object to provide a bottomed pot aggregate, in which the bottoms of the individual pots of seedling raising bottom pot aggregate can be conveniently formed by making planar specific structures in a material paper having a constant width, by adhering, combinatorially adhering and cutting the specific structure to form a band for a pot aggregate having multiple rows of a plurality of pots, and by expanding the band.

Another object of the present invention is to provide a process for manufacturing the pot aggregate which is equipped with bottoms having the specific structures.

BRIEF DESCRIPTION OF THE DRAWINGS

FIG. 1 is a perspective view showing the bottomed pot aggregate of the present invention;

FIG. 2 is a perspective view showing the structure of one pot P of FIG. 1;

FIG. 3 is a perspective view showing the lefthand side bottom of the pot and taken in the perspective direction; and FIG. 4 is a perspective view showing the righthand side bottom.

DETAILED DESCRIPTION OF THE INVENTION

The paper to making a bottomed pot aggregate according to the present invention and to be used for manufacturing the same may be any, if it has a suitable corrosion resistance or if it can be used for manufacturing the seedling raising and tranplanting pots known in the prior art. The paper can be exemplified by natural pulp paper or synthetic paper made of: wood pulp prepared from needle- or broad-leaved trees; a single component of ordinary paper-making natural pulp such as rag pulp, waste paper pulp or bagasse pulp; a mixture of those natural pulp and one or two kinds of synthetic fibers of polyvinyl alcohol; polypropyrene, polyethylene, polyolefin, polyester, polyamide, polyacrylonitrile and polyvinyl chloride; one of composite fibers composed of a plurality of synthetic resins having low and high melting points; a mixture of synthetic fibers of the aforementioned single fibers. The paper material may also be exemplified by: the paper having its wet strength intensified by treating those natural or synthetic papers with a cellulose crosslinking agent; a composite paper prepared by laminating a thin film of the aforementioned synthetic fibers over the natural pulp paper by suitable means; a paper prepared by treating the natural or synthetic paper with a suitably selected corrosion-resisting agent; or a synthetic paper made of one of the aforementioned various synthetic fibers and given a rigidity corresponding to that of the natural paper.

The description of the present invention will be started from that of one pot, because the primary characteristic of the invention resides in the structure of the bottom plate of the pot and because the structure of and the process for forming the pot provide a basis for the process for manufacturing the pot aggregate.

Figure 1:
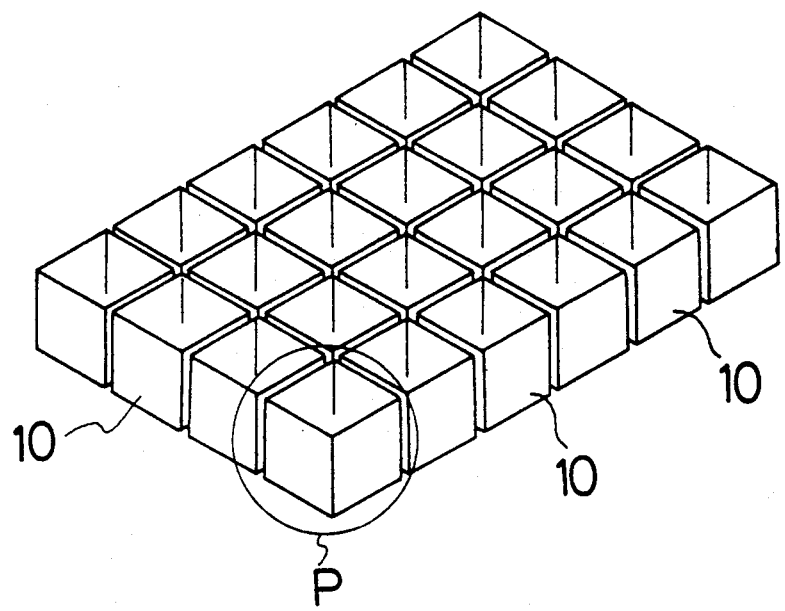
In FIGS. 1 to 4 showing the structure of pots forming the seedling raising bottomed pot aggregate of the present invention.

FIG. 1 is a perspective view showing an aggregate of bottomed cubic flower pots for raising seedlings. Reference numeral 10 designates each of the pots, the adjoining ones of which have their side walls adhered to each other by a water-soluble adhesive.

Figure 2:
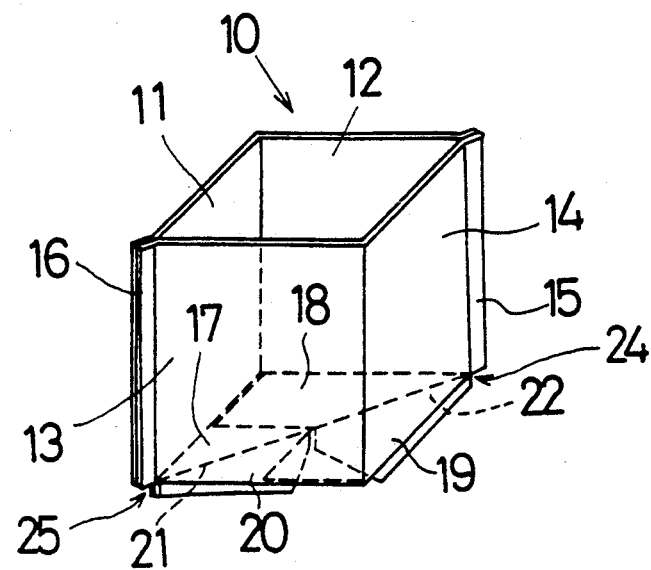

FIG. 2 shows one pot P extracted from the pot aggregate. Reference numerals 11, 12, 13 and 14 designate the individual side walls of the cubic box. These side walls forms a cube, one side of which has a length N and a height H.

Reference numerals 15 and 16 designate adhered portions, in which the two ends of the integral side walls 11 and 12 and the two ends of the integral side walls 13 and 14 are adhered over a width t by an water resistant adhesive.

Figure 3:
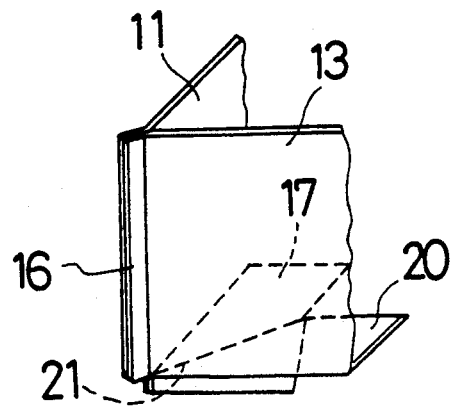

Reference numerals 17 and 20 designate the extensions which are extended from the side walls 11 and 13, respectively, and folded inward at a right angle and adhered to each other, as indicated at 21, to form part of the bottom, as will be more clearly seen from FIG. 3.

Figure 4:
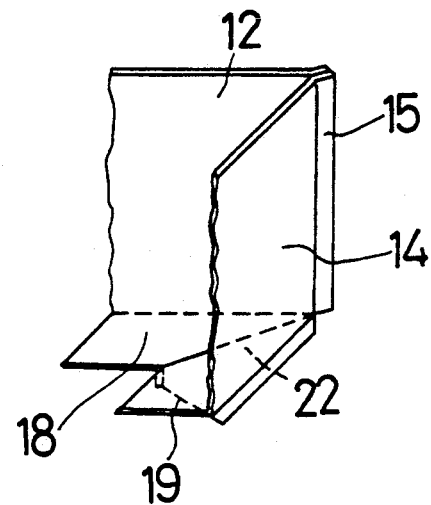

Reference numerals 18 and 19 also designate the extensions which are likewise extended from the side walls 12 and 14 and folded at a right angle to form the other part of the bottom, as shown in FIG. 4. Numeral 22 designates the adhered portion of the extensions 18 and 19.

Thus, the bottom of the cubic pot of the present invention is formed by adhering two pairs of extensions, each pair of which is composed of the extensions folded at a right angle from the side walls forming the pot, along one diagonal of the bottom.

Figure 5:
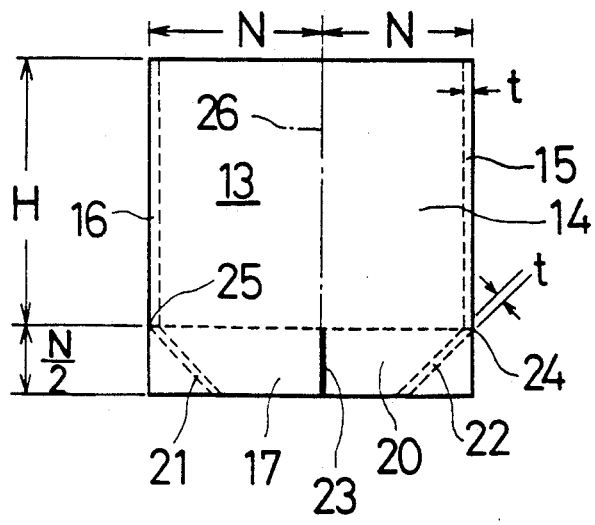
FIG. 5 is a side elevation showing a unit paper or the minimum unit for the material to construct the pot.

FIG. 5 shows a unit paper which is to be expanded to form the pot.

If the square of the cube has each side of the length N and the height H, the aforementioned extensions 17 and 20 forming the bottom of the pot of the present invention are formed by extending their one longitudinal side edge by $\frac{1}{2}$ N for the paper material having a width of 2N. These two papers are overlapped and adhered at the two widthwise side margins 15 and 16 having the width t and at the margins 21 and 22 crossing the two corners of the extensions at an angle of 45 degrees and having the width t. In this case, the extensions 17 and 20 may be either cut in advance along the margins (or lines) 21 and 22 to provide their edges for the margins to be adhered or used for the margins at the whole triangles defined by the margins. On the other hand, the papers to be overlapped may be prepared by folding one sheet of paper into halves. Reference numeral 23 designates a cut at the center of each extension in the extending direction, and reference numerals 24 and 25 designate the joined portions of the margins 15 and 22 and the cut formed in the joined portions of the margins 16 and 22, respectively.

The overlapped two papers thus made of the unit paper are opened upward and downward, as shown along the extending line 26 of the cut 23, to form the pot 10 of FIG. 2. On the other hand, the cubic pot 10 thus manufactured has a square shape, each side of which actually has a length of (N−t), which could not change the gist of the present invention.

Next, a pot aggregate having one row of six pots, as shown in FIG. 1, is manufactured by the use of the unit paper of FIG. 5 by the following process.

Other five sheets of unit paper shown in FIG. 5 are prepared. The righthand side edge of the second material is overlapped along the extension line 26, and corresponding side wall portions only are adhered by a water-resistant adhesive 27. The extended portions are left unadhered because they have to be turned at a right angle with respect to the plane of the Drawing when they are expanded.

Figure 6:
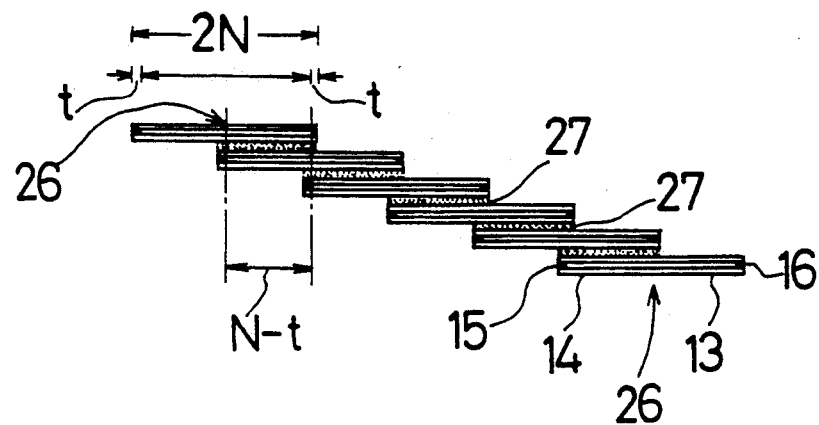
FIG. 6 is a side elevation schematically showing the state of a band, in which the six sheets of FIG. 5 are overlapped for forming one row of six pots including the pot P of FIG. 1.

When the foregoing steps are sequentially followed, a band aggregate is obtained, as shown in side elevation in FIG. 6. If the band aggregate is vertically pulled, as shown, along the extension 26 of the lower unit paper and the extension 26 of the upper unit paper, there can be attained a pot aggregate, in which six cubic pots 10 are longitudinally contiguous with the individual bottoms shown in FIG. 2.

Figure 7:
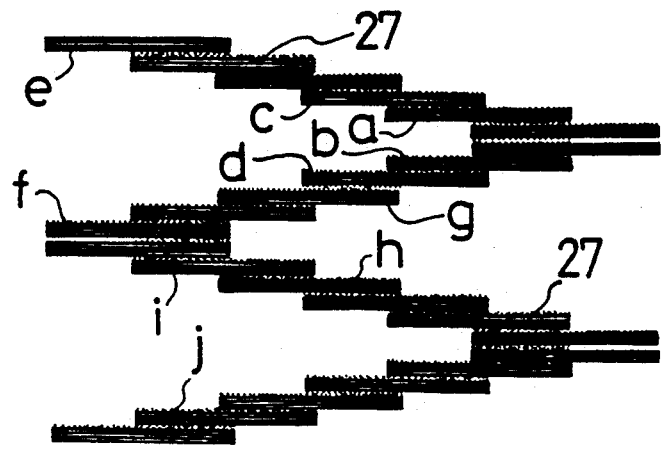
FIG. 7 is a side elevation schematically showing the state, in which the bands of FIG. 6 are combined and adhered back to back and alternately one by one by the known method so as to form a pot aggregate having four rows each composed of six pots of FIG. 1.

The method of forming the continuous pot is well known in the art, and the method of forming a pot aggregate by arranging multiple rows of cubic pots shown in FIG. 1 is also known in the art, as schematically shown in FIG. 7. As a matter of fact, the faces a and b, c and d, e and f, g and h, and i and j are adhered individually to each other by a water-soluble adhesive, as shown in FIG. 7.

Since the bottom of the pot of the present invention has its one pair of opposed corners forming triangular pyramids of its two side walls and a portion of its integral bottom, its apexes are so strong that it is remarkably effective for preventing the soil from coming out, as described in the introduction of this Specification, even if it failed to be supported in its entirety by the side walls.

Another advantage of the present invention resides in that the band aggregate shown in FIG. 6 can be easily mass-produced.

Figure 8:
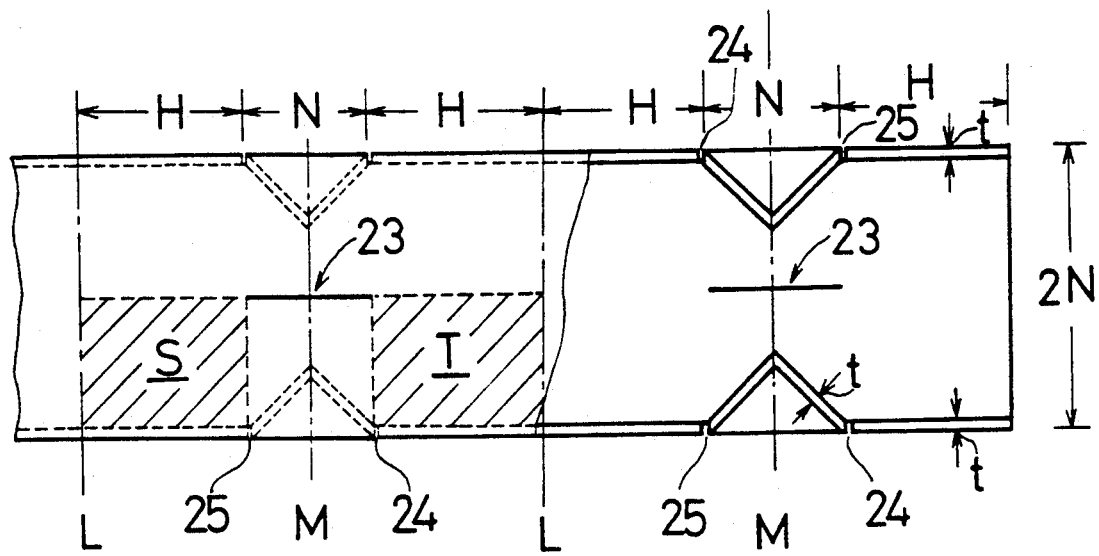
FIG. 8 is a top plan view showing a cut band, in which the unit papers of FIG. 5 are continuously arrayed for mass-producing the bands of FIG. 6.

FIG. 8 shows a cut band aggregate providing a basis for the mass production.

In the structure of this basic band aggregate, one pair of pot materials shown in FIG. 5 are arranged in the direction of the height H and made contiguous in opposite directions, and these pairings are continuously repeated in the direction H.

In the embodiment of FIG. 8, specifically, one long sheet of paper having a width of 2N is set from its two side edges with the size H and then with the size N, and V-shaped or triangular margins to be adhered are formed in the regular triangle having a base N. A water-resistant adhesive is applied, as shown at the righthand side of the Drawing, to the margins of the width t of the side edges of the paper thus obtained by repeating the aforementioned steps. As a result, two sheets of paper thus worked are adhered in the overlapped manner, as shown at the lefthand side of the Drawing. The cuts 23, 24 and 25 are made through the two overlapped papers. Reference letters L and M designate cut lines, which are not formed in each of the basic band aggregate.

Figure 9:
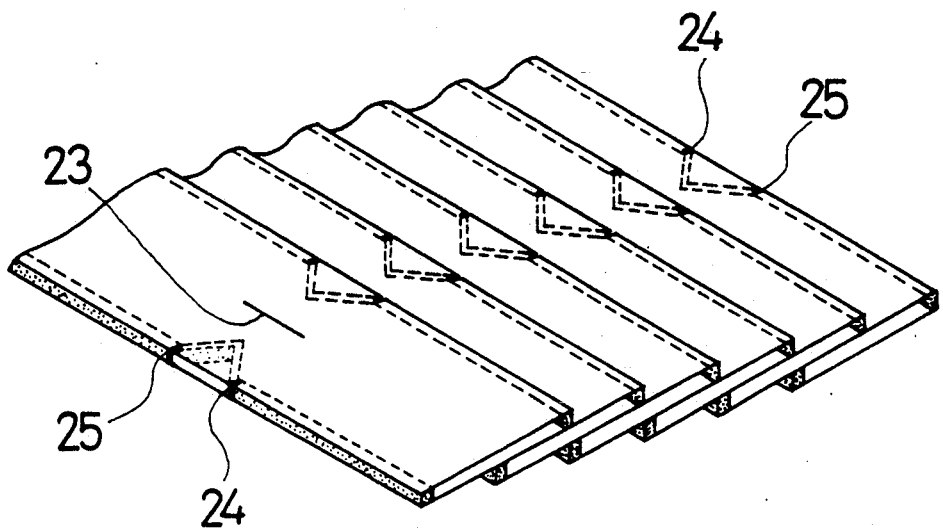
FIG. 9 is a perspective view showing the cut bands overlapped partially under given conditions so that they may be cut with the minimum width in the overlapped direction to provide the bands of FIG. 6.
Figure 10:
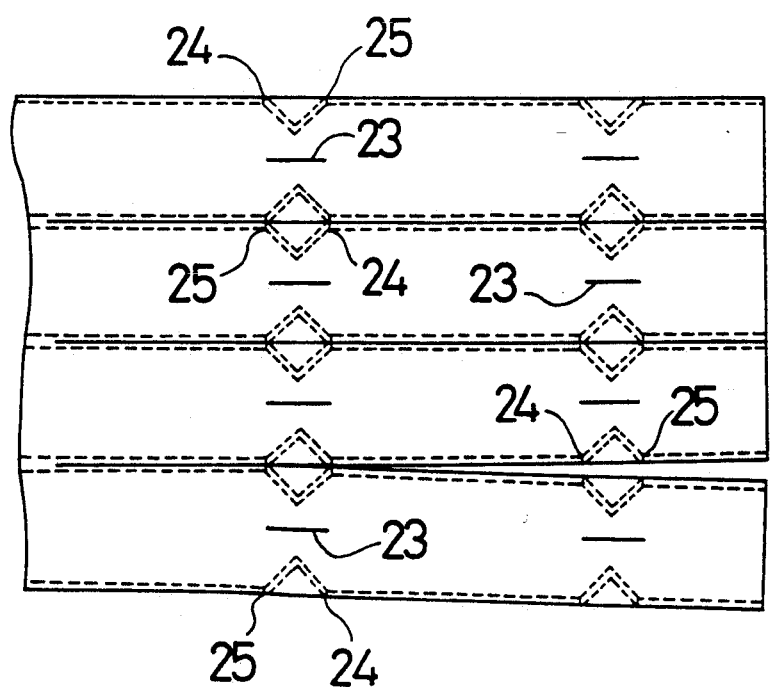
FIG. 10 shows the cut bands which are worked in juxtaposition in a large paper so that they may be mass-produced.

Hatched portions T and S show only one side wall of the portions for forming the pot aggregate finally. A water-soluble adhesive is applied to the opposed portions of each pair to adhere the side wall portions by fixing the transverse positions in conformity with the V-shaped margins such that one side edge of the other basic band aggregate is adjusted to the cut 23. The six overlapped band aggregates are overlapped, as shown in FIG. 9.

The overlapped aggregate thus obtained is cut along the lines L and M of FIG. 8 to provide the band aggregate shown in FIG. 6.

Therefore, the number of the pots of the final aggregate is obtained by multiplying the number of overlapped sheets of the basic band aggregates by the number of overlapped bands, as shown in FIG. 7.

EMBODIMENT

An unbleached craft paper (A) of 80 g/m$^2$ having a width of 115 mm and made by adding 1 wt. % of 8-oxyquinoline copper to craft pulp is continuously let off a drum winder. This craft paper is subjected to: a first step of applying a water resistant adhesive (e.g., emulsion of vinyl acetate) to a section of a length of 140 mm (wherein the leading and trailing portions have a length of 70 mm) at an interval of 52.5 mm while leaving a width of 5 mm from the righthand and lefthand side edges in the let-off direction as the margins; and a second step of applying a water resistant adhesive to the V-shaped portions in which the leading and trailing ends of the first adhesive-applied portions across the interval of 52.5 mm and folded inwardly of the paper A at an angle of 45 degrees with respect to the let-off direction.

This V shape of this second step is such that the V-shaped edge has an open angle of 90 degrees and is located 31.25 mm inside of each side edge at a right angle with respect to the let-off direction.

Next, an unbleached craft paper (B) made of an identical material and having identical specifications but prepared separately is continuously let off and is overlapped on and applied to the paper A with their two sides arranged, to form a continuous band. The widthwise central portion (at the distance of 57.5 mm from the sides) of the continuous band over all the length of 52.5 mm and the portion having the width of 5 mm connected at the foregoing first and second steps are cut through the band by means of a die cut roll, to form a continuous cut band.

Next, this band is cut along a phantom line crossing the central portion of the sections adhered by the first step, to prepare 55 sheets of two-continuous unit papers having one adhered portion formed into the V-shape by the second step. Of these, five sheets are arranged to have their one-half width portions (of 52.5 mm) overlapped stepwise with respect to the width of 105 mm excepting the individual applied portions of 5 mm by the first step, and the overlapped portions excepting the portions adhered by the second step are adhered by a water-soluble adhesive (e.g., polyvinyl alcohol), to prepare eleven bands having a length of 192.5 mm and a width of 325 mm and each composed of five two-continuous unit papers.

The eleven bands are sequentially laminated and arrayed while every two of them are turned in the longitudinal direction, and the overlapped portions excepting the portions adhered by the second step are adhered by a water-soluble adhesive (e.g., polyvinyl). This adhered sheet is cut along the phantom line extending the edge of the V-shaped adhered portion of the second step to form two overlapped bands. These bands are expanded to produce two bottomed pot aggregates, in which cubic bottomed pots having a side of 52.5 mm and a height of 70 mm are arrayed in five rows and eleven columns.

By the steps of adhering and expanding papers of drastically simple shape, according to the present invention, it is possible to manufacture a seedling raising pot aggregates which have their individual pots equipped with bottoms sufficient at least for preventing the soil from dropping.

What is claimed is:

1. An aggregate of pots for raising seedlings, comprising a plurality of cubes adhered to one another in a grid pattern, the cubes each having a predetermined height and formed from two sheets of paper which are pre-shaped and adhered to each other, each sheet comprising:
   (i) a rectangular portion having a length and a width, the width being substantially equal to the height of one of the cubes; and
   (ii) at least two extensions extending from the rectangular portion, the extensions each having a length which is substantially ½ the length of the rectangular portion, and a width which is substantially ¼ the length of the rectangular portion;
   wherein the sheets of each cube have marginal edges which extend along side edges of the rectangular portion in a direction parallel to a widthwise direction of the rectangular portion, and wherein each extension has a marginal edge which extends substantially at an angle of 45° relative to side edges of the extensions in the finished cube; and
   wherein the marginal edges of the rectangular portions and the marginal edges of the extensions are adhered to each other, and a central cut is provided in the extensions in a direction parallel to the widthwise direction of the rectangular portion, whereby the two sheets of paper forming each cube may be folded flush with each other.

2. An aggregate of pots for raising seedlings comprising a plurality of open-top paper cubes, at least one side wall of each cube being adhered to a corresponding side wall of an adjacent cube to form a grid pattern of cubes, each cube comprising:
   side walls formed from first and second sheets of material extending in a first direction and intersecting at first diagonally opposed corners of the cube and defining an interior of the cube, each side wall having an extension folded toward the interior of the cube to define a flat bottom of the cube, the bottom of the cube including a first diagonal extending between the opposing first corners of the cube and a second diagonal extending perpendicular to the first diagonal;
   the extensions being adhered to each other along the first diagonal and being overlapped with each other along the second diagonal.

3. The aggregate of pots according to claim 2, wherein the extensions adhered to each other along the first diagonal define an adhered portion, and a length of the adhered portion is smaller than a length of the first diagonal.

4. The aggregate of pots according to claim 2, wherein the first and second sheets are adhered to each other along margins of the sheets.

5. The aggregate of pots according to claim 4, wherein, each sheet comprises a rectangular portion with at least two extensions extending therefrom, the sheets being adhered to each other along lines extending substantially at an angle of 45° relative to side edges of the extensions.

6. The aggregate of pots according to claim 2, wherein each sheet comprises a rectangular portion having a width substantially equal to a height of one of the cubes.

7. The aggregate of pots according to claim 6, wherein each sheet comprises at least two extensions extending from the rectangular portion, each extension having a length and a width.

8. The aggregate of pots according to claim 7, wherein the length of each extension is substantially ½ the length of the rectangular portion.

9. The aggregate of pots according to claim 8, wherein the width of each extension is substantially ¼ the length of the rectangular portion.

10. The aggregate of pots according to claim 7, wherein a central cut extending in a direction parallel to a widthwise direction of the rectangular portion separates the extensions.

11. The aggregate of pots according to claim 5, wherein the length of each extension is substantially ½ the length of the rectangular portion.

12. The aggregate of pots according to claim 11, wherein the width of each extension is substantially ¼ the length of the rectangular portion.

13. The aggregate of pots according to claim 8, wherein the extensions are substantially rectangular.

14. The aggregate of pots according to claim 9, wherein the extensions are substantially rectangular.

15. The aggregate of pots according to claim 11, wherein the extensions are substantially rectangular.

16. The aggregate of pots according to claim 12, wherein the extensions are substantially rectangular.

17. The aggregate of pots according to claim 5, wherein each extension lies completely within a plane.

18. The aggregate of pots according to claim 7, wherein each extension lies completely within a plane.

19. The aggregate of pots according to claim 5, wherein a central cut extending in a direction parallel to a widthwise direction of the rectangular portion separates the extensions.

* * * * *